Figure 1:
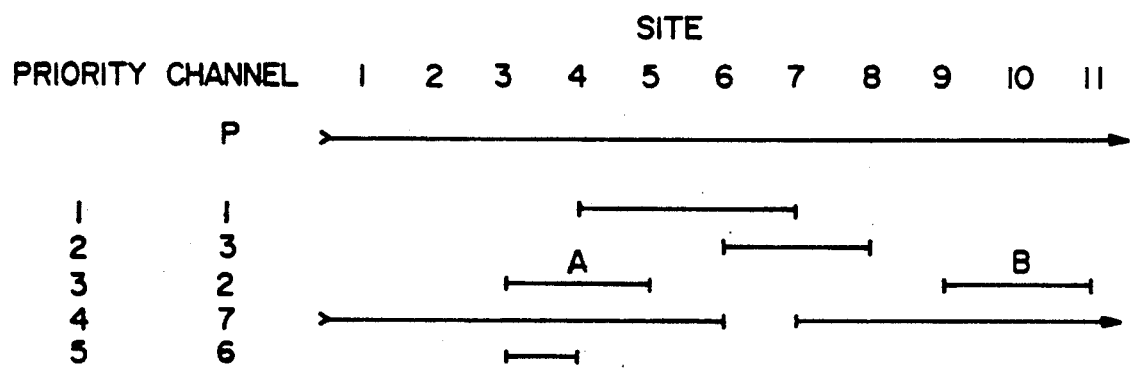

United States Patent [19]

Reid et al.

[11] Patent Number: 5,029,158

[45] Date of Patent: Jul. 2, 1991

[54] PROTECTION SWITCHING IN A MULTI-CHANNEL COMMUNICATIONS SYSTEM

[75] Inventors: David I. Reid, Port Coquitlam; Kenneth A. Bobey, Edmonton, both of Canada

[73] Assignee: Northern Telecom Limited, Montreal, Canada

[21] Appl. No.: 76,958

[22] Filed: Jul. 23, 1987

[51] Int. Cl.⁵ .............................. H04J 1/16; H04J 3/14
[52] U.S. Cl. .................................................... 370/13.1
[58] Field of Search .......................... 370/13, 13.1, 16; 379/4, 8, 26

[56] References Cited

U.S. PATENT DOCUMENTS 4,646,286  2/1987  Reid et al. ............................ 370/16
4,680,776  7/1987  Ikeuchi et al. ........................ 370/16

Primary Examiner—Douglas W. Olms
Assistant Examiner—Wellington Chin
Attorney, Agent, or Firm—R. John Haley; Dallas F. Smith

[57] ABSTRACT

In a multi-channel, multi-site communications system, spans on working channels extending in an overlapping manner among the sites are afforded protection by a protection channel in accordance with a priority scheme. Enabling of protection switching for each span in the event of a signal failure on the span is dependent upon whether there is any protection higher priority overlapping span. This is determined individually for each span in response to each change in protection requests in the system.

5 Claims, 3 Drawing Sheets

PROTECTION SWITCHING IN A MULTI-CHANNEL COMMUNICATIONS SYSTEM

This invention relates to protection switching in a multi-channel communications system.

Reference is directed to Reid et al. U.S. Pat. No. 4,646,286 issued Feb. 24, 1987 and entitled "Communications System with Protection Switching and Channel Identities".

In such communications systems a plurality of communications channels, for example optical fiber transmission channels via which digital signals are transmitted in time division multiplex frames, are provided for communications among a plurality of different locations or sites. In order to maintain transmission in the event of a fault on one of the channels, a so-called protection channel is also provided for carrying the traffic of the faulty channel. The routing of traffic from a faulty channel onto the protection channel is referred to as protection switching.

In order to avoid unnecessary loss of the information being communicated, it is necessary for protection switching to take place rapidly in the event of a fault. However, it is also desirable for different channels to be able to have different priorities, so that in the event of a fault on more than one channel the protection channel is awarded to the highest priority channel. The resolution of priorities involves procedures, which may be implemented in software and effected by processors at the various locations or sites and which must communicate with one another, resulting in delays which conflict with the requirement for rapid protection switching.

Furthermore, the protection switching and resolution of priorities is complicated by the need to accommodate arbitrary channel arrangements, whereby a single protection channel can be used to protect traffic from faults on a plurality of regular channels in different parts of the communications system.

In the communications system described in the patent referred to above, hardware is provided at each location or site for effecting a rapid protection switch in the event of a fault occurring on a channel. Each channel has a respective priority for the protection switching of its traffic. After any change in the protection switching state of the system it is necessary to determine from this priority, for each channel at each location at which a protection switch can be made, whether or not a subsequently detected fault on the channel should result in a hardware protection switch. The method of this invention is directed to this end.

According to this invention there is provided in a communications system having a plurality of working channels and a protection channel extending among a plurality of at least three sites, the working channels including a plurality of spans each extending via a communications channel between respective transmit and receive sites and having a predetermined priority for protection switching of traffic on the span via the protection channel between said sites, a method of facilitating protection switching in response to protection requests comprising the steps of, individually for each span in response to a change in protection requests in the system: effecting a protection switch for the respective span if there is a protection request for this span and there is no protection request for any higher priority overlapping span; and otherwise enabling a protection switch for the respective span in response to a fault condition of the span if there is no protected higher priority overlapping span.

Preferably for each respective span each determination of the protection status of any higher priority overlapping span comprises the steps of: creating a list of all spans having a protection request and having a higher priority for protection switching than the respective span; and determining whether a span in said list overlaps the respective span. The list is preferably sorted in order of priority for protection switching Advantageously the determining step comprises the steps of: (a) determining whether the list is empty, if so indicating that there is no higher priority overlapping span, and if not continuing to step (b); (b) determining whether the highest priority span in the list overlaps the respective span, if so indicating that there is a higher priority overlapping span, and if not continuing to step (c); (c) eliminating from the list the highest priority span and any other span which overlaps it, and returning to step (a).

Figure 2:
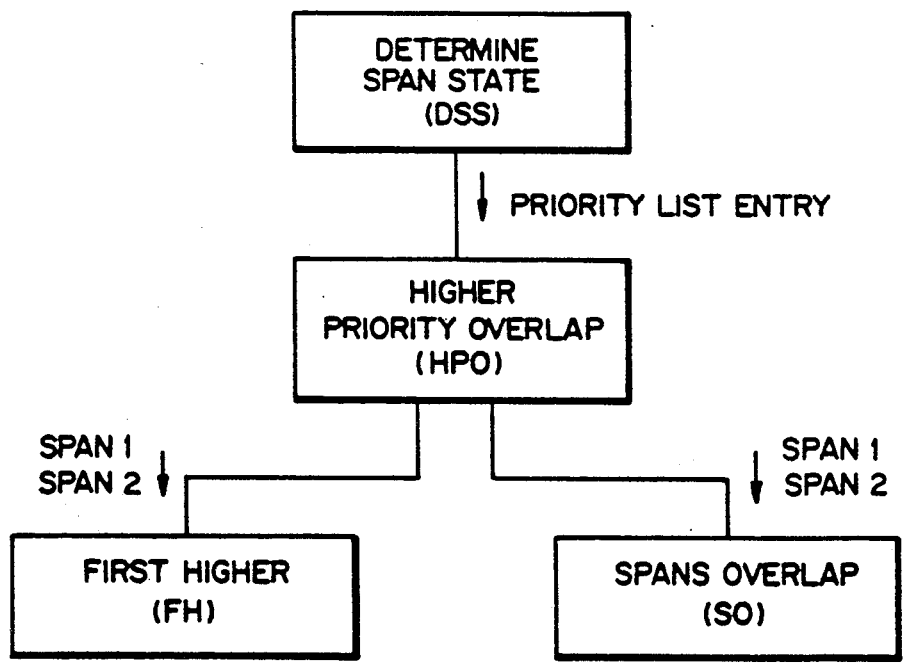
Figure 3:
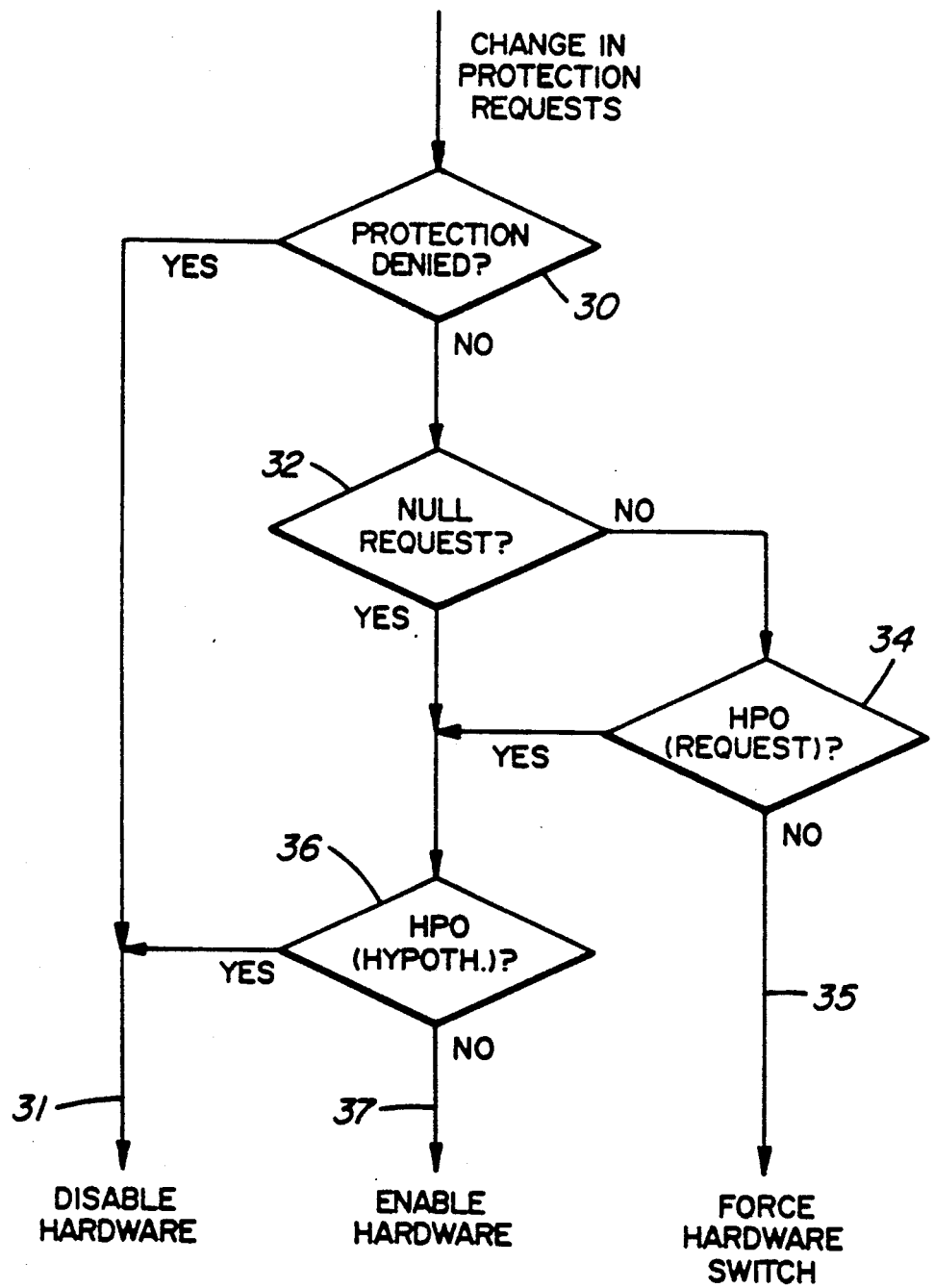
Figure 4:
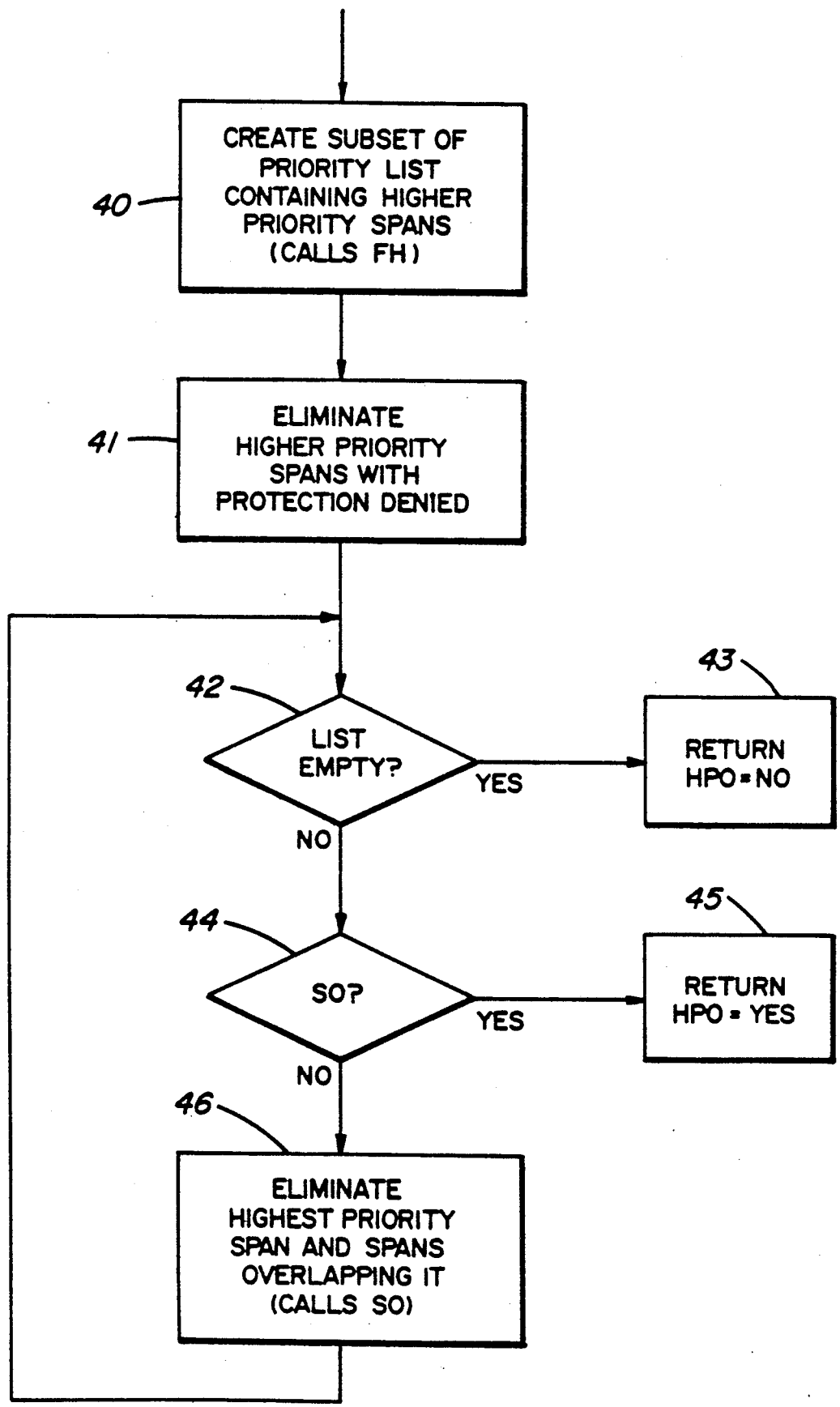

The invention will be further understood from the following description with reference to the accompanying drawings, in which:

FIG. 1 schematically illustrates a simplified arrangement of channels in an optical fiber communications system;

FIG. 2 illustrates the structural arrangement of procedures used in carrying out the method of an embodiment of the invention; and FIGS. 3 and 4 are flow charts relating to the procedures of FIG. 2.

Referring to FIG. 1, a greatly simplified arrangement of optical fiber communications channels, numbered 1, 2, 3, 6, and 7 and referred to as working channels, extending between various ones of locations or sites 1 to 11, is illustrated in order to explain the principles in accordance with which it is determined whether or not the traffic of a faulty channel should be switched to a protection channel P which extends between all of the sites. FIG. 1 also indicates a respective priority, 1 to 5, for each working channel, and the working channels are represented from the top to the bottom in FIG. 1 in order of priority, the highest priority at the top. For simplicity, FIG. 1 relates to only a single transmission direction.

In FIG. 1 channel 1, which has the highest priority for protection purposes, extends from site 4 to site 7 and may have glassed-through or repeatered connections, at which protection switching of traffic between this channel and the protection channel P can not be effected, at the intermediate sites 5 and 6. Channel 3, extending from site 6 to site 8, has the next highest priority, followed by channel 2 which has two separate and different spans A, between sites 3 and 5, and B, between sites 9 and 11. Channel 7 extends from site 7 to site 6 via sites 8 to 11 and 1 to 5, it being assumed here that the communications system is in the form of a loop with this channel wrapping around from site 11 to site 1. The protection channel P is similarly looped from site 11 to site 1. Channel 6, between sites 3 and 4, has the lowest priority.

It should be appreciated that a practical communications system may be much more complicated than this, in particular including drop-and-insert sites at which traffic may be both received from and supplied to a channel, more channels and links on those channels, and catering for both directions of transmission.

Thus FIG. 1 illustrates for the working channels various communications spans each between a pair of sites or locations, and each of which can be protected as a whole by routing its traffic via the protection channel P. Accordingly, each such span can be referred to as a protection span. To facilitate protection switching, as described in U.S. Pat. No. 4,646,286 already referred to an individual processor is provided at each of the head (transmit) and tail (receive) ends of each protection span. Thus for example at site 4 as shown in FIG. 1 there would be at least a processor in respect of the head end of the protection span on channel 1 and another processor in respect of the tail end of the protection span on channel 6, as well as an individual processor in respect of the protection channel P. Communication among the processors at all of the sites takes place via overhead information on the communications channels between the sites and via direct connections between different processors at the same site.

Now if, for example, traffic on protection span 2A of channel 2 is being protected in that it is being transmitted via the protection channel P from site 3 to site 5, then in the event of a fault also occurring on channel 6 or 7 no protection switch should be made because these channels overlap span 2A and have lower priorities. In the event of a fault occurring on protection span 2B of channel 2 and/or the channel 3 a protection switch should be made because these do not overlap the span 2A or one another and the protection channel P can simultaneously protect all of these spans. In the event of a fault occurring on channel 1 a protection switch should also be made because this is a higher priority channel, but now the protection for the span 2A will be dropped because of the overlap between channel 1 and span 2A between sites 4 and 5.

If traffic on channel 1 is being protected, i.e. transmitted via the protection channel P, then a protection switch should not be made in the event of a fault also occurring on any of the lower priority overlapping spans 3, 2A, and 7. A protection switch should be made in the event of a fault also occurring on the lowest priority channel 6, because all of the higher priority protection spans 7 and 2A overlapping this channel are blocked from protection by their overlaps with channel 1. A protection switch should also be made in the event of a fault also occurring on the protection span 2B, because this is not overlapped by any higher priority channel.

Thus for each protection span on each channel, whether or not a protection switch should be enabled, so that it can be effected rapidly by the provided hardware in the event of a signal failure being detected on that span, is dependent upon whether there is any higher priority overlapping protection span which is currently protected. This is determined for each protection span by the processor at the head and tail ends of the span, the processor operating as described below.

Briefly, in any state (i.e. arrangement of working channels and protected and non-protected spans) of the communications system each processor prepares its associated protection switching hardware so that, in the event of a protection request occurring, the hardware is able to respond rapidly to effect any protection switch which is appropriate in the circumstances. Subsequently, and more slowly, each processor updates its preparation of the hardware in accordance with the possibly changed state of the system, so that any subsequent protection request can again be responded to rapidly. The manner in which the protection switching is effected is described in U.S. Pat. No. 4,646,286 already referred to. A protection request can arise as a result of a fault condition, such as a signal failure, a manual control, or an automatic control for example for testing purposes.

Each processor has a read-only store which stores relative priorities of protection requests and channels (and hence protection spans), in such a manner that any protection request has a unique priority relative to all other possible protection requests, thereby enabling priorities between simultaneous protection requests always to be resolved. For example, protection requests may include the following relative priorities, in order of decreasing priority:

Highest priority
1. Deny protection
2. Force Switch
3. Signal Failure
4. Signal Degrade
5. Manual Switch
and so on.

The relative priorities of simultaneous protection requests with the same priority in the above list are resolved on the basis of the channels to which they relate: each channel may have any one of for example four different priorities, and for equally-rated channels a lower channel number is given priority over a higher channel number.

Each processor maintains, sorted in order of priority in accordance with the above relative priority information, an individual copy of a priority list which represents the protection request status for all of the spans for which protection switching may be effected in the system. For example, this list contains, for each such protection span, representations of the channel used for the communications, the end points of the span, and protection request flags. This priority list is used as described below to determine whether or not, in the event of a protection request for a particular span, a protection switch should be made, and to enable the hardware at the respective site accordingly. In this manner, a hardware protection switch can be effected, if and when appropriate, very rapidly in the event of a protection request, without incurring delays due to resolution of priorities or communications among processors.

It is important to note that each protection span is only represented in the priority list if it has a non-null set of protection requests. For any particular communications system, in practice the number of spans with non-null protection requests is fairly small at any given time. Accordingly, the size of the priority list can be much less than would be the case for a large system if all of the spans were always represented.

Following any change in protection requests and any consequent hardware protection switching action, via the communications among the processors the priority lists of all of the processors are updated, and the hardware associated with each is enabled for a rapid response to any subsequent protection request.

More particularly, following each change in protection requests in the communications system, each processor at the head or tail end of a working span executes, for that span, a procedure Determine Span State (DSS) which is described with reference to FIG. 3. This procedure DSS calls a procedure Higher Priority Overlap (HPO) which determines for any span whether there is a protected higher priority overlapping span;

this is described with reference to FIG. 4. The procedure HPO in turn calls procedures First Higher (FH) and Spans Overlap (SO) which are described below. FIG. 2 illustrates the structural arrangement of these procedures and parameters passed therebetween.

Referring to FIG. 3, in response to a change in protection requests in the system, each processor associated with (i.e. at the head or tail end of) a working protection span runs the procedure DSS for that span, initially determining from its priority list in a block 30 whether protection is denied for that span (the highest priority situation discussed above). If so, via a control path 31 the protection switching hardware associated with the processor and span is (or remains) disabled (a lockout state) so that no protection switch for this span can take place, and the procedure DSS in that processor terminates.

If the span is not denied protection, then in a block 32 the procedure DSS determines from the priority list whether there is no actual protection request for this span (i.e. whether all of the protection request flags are nulls). If there is an actual protection request for the span, then in a block 34 the procedure HPO is called, passing the priority list entry for the span as a parameter, to determine whether or not a protection switch should be forced, in response to this request, via a control path 35. If there is a protected higher priority overlapping span then no such forced protection switch is allowed.

In the latter case, and in the event that in the block 32 it is determined that there is no actual protection request for this span, then in a block 36 the procedure HPO is called, passing as a parameter the priority list entry which would exist for the span in the event of a hypothetical signal failure which could subsequently occur on the span. If there is a protected higher priority overlapping span then no protection switch would be allowed in response to such a protection request, and accordingly the associated hardware is disabled via the control path 31. Otherwise, via a control path 37 the hardware is enabled (a ready state) to effect a protection switch in the event that such a signal failure occurs.

Referring to FIG. 4, the procedure HPO initially, at a block 40, creates a subset of the priority list containing entries for only those spans which have a higher priority than the current span, whose identity is given by the passed parameter. The creation of this subset list is considerably facilitated by the fact that, as already described, the priority list is sorted in order of priority. Thus the priority list need be checked only from the highest priority entry to the first entry having the same or lower priority than the current span. In order to create this subset list, the block 40 repeatedly calls the procedure FH, passing as parameters to it the identities SPAN1 and SPAN2 of two spans whose relative priorities as discussed above are to be compared. For each call, one span is the current span and the other is a respective one of the other spans in the priority list, which other span is included in the subset list only if it has a higher priority than the current span.

In a block 41, any of the higher priority spans which are included in the subset list which are denied protection are eliminated from the subset list. In a block 42 a check is made as to whether the subset list is empty, i.e. whether there is no higher priority overlapping span currently being protected. If it is, then at a block 43 the procedure HPO ends with the result HPO=NO being returned to the calling procedure DSS.

If the subset list is not empty, then at a block 44 the procedure SO is called to determine whether or not the highest priority span remaining in the subset list overlaps the current span. If there is a protected higher priority overlapping span, then a protection switch can not be enabled for the current span and in a block 45 the procedure HPO ends with the result HPO=YES being returned to the calling procedure DSS.

As illustrated in FIG. 2, the procedure SO is supplied with the identities SPAN1 and SPAN2 of the current span and the higher priority span as parameters, and determines whether or not there is any overlap simply by comparing the end points of the spans. In this comparison, allowance for wraparound, such as is the case for channel 7 in FIG. 1, of either or both channels is made.

If the check by the procedure SO at block 44 of the procedure HPO establishes that this highest priority span in the subset list does not overlap the current span, then this highest priority span, and any spans still in the subset list which can not be protected because they overlap this highest priority span, are eliminated from the subset list at a block 46. A return to the block 42 is then made to check again whether the subset list is empty. In a similar manner to that described above, the elimination of blocked spans in the block 46 is based on the spans overlapping the highest priority span as already described with reference to FIG. 1, and involves further calls of the procedure SO.

While block 40 refers to creation of a subset list from the priority list, and blocks 41 and 46 refer to elimination of entries from this subset list, it should be appreciated that these steps can be achieved simply by setting and resetting flags in the priority list itself.

For each processor associated with the protection channel P, in a similar manner to that described above for the processors associated with the working channels, in response to a change in protection requests the processor executes a procedure to determine whether or not the protection channel should be bridged through at the particular site concerned. For example, the protection channel processor at site 5 in FIG. 1 would need to bridge through the protection channel P, to repeat incoming traffic on the outgoing path, for protection of traffic on the channel 1 for which the site 5 is an intermediate site but not for protection of traffic on the span 2A for which the site 5 is the tail end.

Accordingly, in response to each change in protection requests in the system each protection channel processor determines, using the priority list and procedure HPO as described above, the highest priority protection requests, which are not blocked as a result of the overlapping situations discussed above, incoming to and outgoing from the respective site, and on the basis of their relative priorities determines whether or not a bridged through state is adopted for the protection channel P at this site.

Although a particular embodiment of the invention has been described in detail, it should be appreciated that numerous modifications, variations, and adaptations may be made thereto without departing from the scope of the invention as defined in the claims. In particular, as already observed the invention may be applied to both directions of transmission in a bidirectional communications system, and the communications system may be much larger and more complicated than that described above. Furthermore, the invention may be applied in a similar manner to systems with more than one protection channel for each transmission direction.

What is claimed is:

1. In a communications system having a plurality of working channels and a protection channel extending among a plurality of at least three sites, the working channels including a plurality of spans, each span extending via a communications channel between respective transmit and receive sites and having a predetermined priority for protection switching of traffic on the span via the protection channel between said sites, a method of facilitating protection switching comprising the steps of, individually for each span in response to a change in protection requests in the system:

effecting a protection switch for the respective span if there is a protection request for this span and there is no protection request for any higher priority overlapping span; and otherwise enabling a protection switch for the respective span in response to a fault condition of the span if there is no protected higher priority overlapping span.

2. A method as claimed in claim 1 wherein for each respective span each determination of the protection status of any higher priority overlapping span comprises the steps of:

creating a list of all spans having a protection request and having a higher priority for protection switching than the respective span; and determining whether a span in said list overlaps the respective span.

3. A method as claimed in claim 2 wherein the determining step comprises the steps of:

(a) determining whether the list is empty, if so indicating that there is no higher priority overlapping span, and if not continuing to step (b);

(b) determining whether the highest priority span in the list overlaps the respective span, if so indicating that there is a higher priority overlapping span, and if not continuing to step (c);

(c) eliminating from the list the highest priority span and any other span which overlaps it, and returning to step (a).

4. A method as claimed in claim 2 wherein said list is sorted in order of priority for protection switching.

5. A method as claimed in claim 3 wherein said list is sorted in order of priority for protection switching.

* * * * *